March 8, 1949.  H. E. STONEBRAKER  2,463,725
METHOD OF CUTTING GEAR PAIRS
Filed Dec. 10, 1945
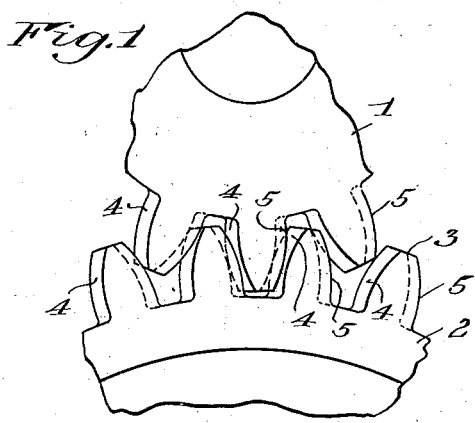
Fig.1
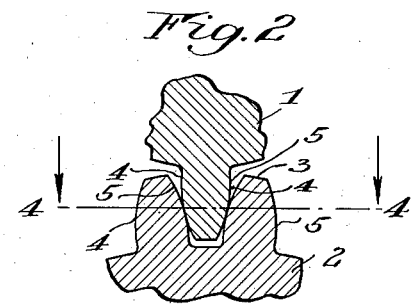
Fig.2
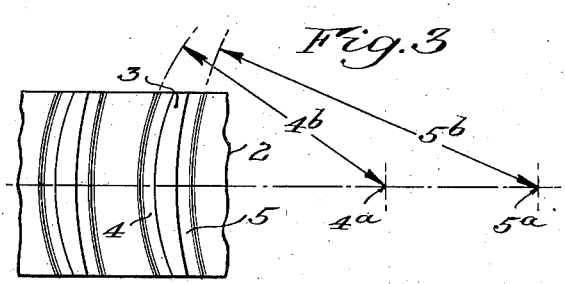
Fig.3
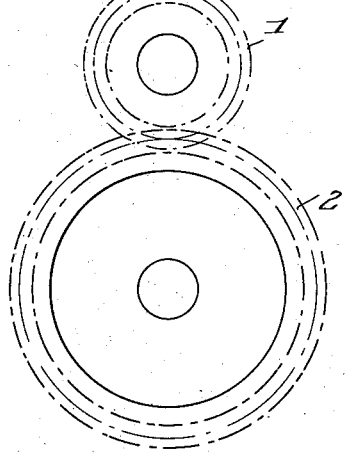
Fig.7
Fig.4
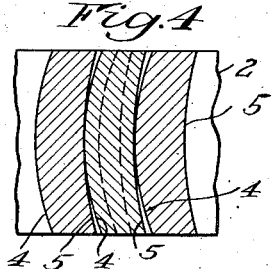
Fig.6
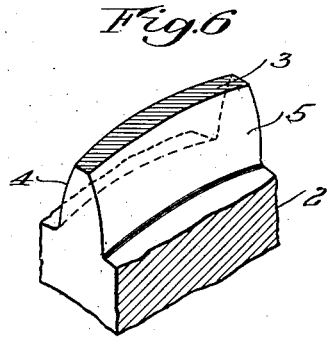
Fig.5
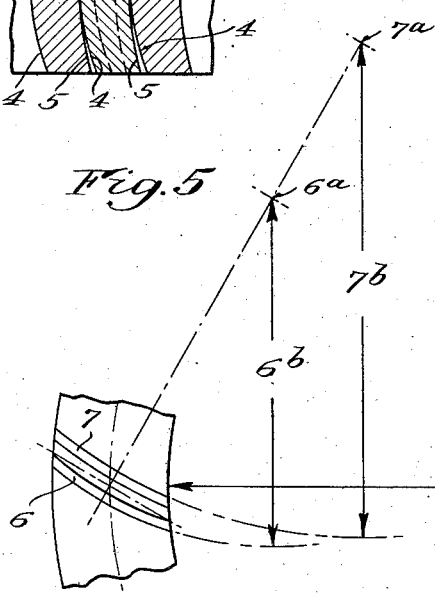
INVENTOR.
Harold E. Stonebraker Patented Mar. 8, 1949

2,463,725

UNITED STATES PATENT OFFICE 2,463,725

METHOD OF CUTTING GEAR PAIRS

Harold E. Stonebraker, Rochester, N. Y.

Application December 10, 1945, Serial No. 634,028

3 Claims. (Cl. 90—5)

This invention relates to a pair of gears and method of cutting the same, and has for its purpose to afford a pair of gears with longitudinally curved teeth characterized by tooth faces having closer bearing or contact at the center of the gear face or between the ends of the teeth than at the edges of the gear face or at the ends of the teeth, resulting in greater quietness than with gears as heretofore constructed, and eliminating the necessity for extremely close adjustment to attain efficient relationship between two members of a gear pair.

Another object of the invention is to produce a gear pair with uniform teeth of maximum strength at the point where greatest strength is desired and having a gradual engagement endwise of the teeth between contacting tooth faces from the points where opposite tooth faces are at a maximum distance apart toward the points where they are in closest contact with each other so as to bring about extreme quietness, increased efficiency, a wider range of adjustment, and longer wear than with curved tooth gears as heretofore constructed.

An additional purpose of the invention is to afford a method by which an improved gear pair having these advantages can be economically cut with two rotary face mill cutters traveling in slightly different circular paths about different centers.

A further object of the invention is to afford a gear pair with teeth constructed in such a fashion that all the convex tooth faces on both members of the pair can be cut with the same cutter or with tools traveling in the same circular path, while all the concave faces on both members of the pair can also be cut with the same cutter or with tools traveling in the same circular path, thus affording an economical, fast method of production and permitting the contacting tooth faces to conform as closely to each other as necessary to attain most perfect action while differing sufficiently to insure maximum bearing at the center or at a portion of the tooth face less than its entire length.

To these and other ends, the invention consists in the construction and method that will appear clearly from the following description when read in conjunction with the accompanying drawings, the novel features being pointed out in the claims following the specification.

In the drawings:

Fig. 1 is a view in end elevation showing a spur pinion tooth engaged with teeth of a spur gear, the gear and pinion being provided with symmetrical teeth constructed in accordance with a preferred embodiment of the invention;

Fig. 2 is a vertical sectional view taken centrally of Fig. 1;

Fig. 3 is a plan view of the gear illustrated in Fig. 1;

Fig. 4 is a horizontal sectional view on the line 4—4 of Fig. 2 looking in the direction indicated and showing the relation between coacting tooth faces;

Fig. 5 is a plan view of a bevel gear showing the invention as applied to spiral teeth;

Fig. 6 is a perspective view of the spur gear tooth, and

Fig. 7 is an end view of the spur gear and pinion of Fig. 1.

The invention is applicable to any gear pair having lengthwise curved teeth including both spur and bevel gears, particularly gears having teeth conforming lengthwise to circular arcs and produced by rotary face mill cutters or tools moving in circular paths, and is useful in connection with gears having involute teeth or cross-sectional tooth shapes produced by a relative generating motion between the gear and cutting tool during the cutting operation, as well known in the art.

To illustrate the invention readily, there is shown a spur pinion 1 in driving relation with a spur gear 2 but it will be understood that the gear pair 1 and 2 are only for explanatory purposes to show the structure of mating teeth constructed in accord with the invention, which may be employed with equal success on bevel gears or spiral gears.

Referring to Fig. 3, 3 designates the top of a tooth having a longitudinally convex face 4 and a longitudinally concave face 5. The convex face 4 conforms to the arc of a circle described about a center $4^a$ with a radius $4^b$, while the concave face 5 conforms to the arc of a circle described about a center $5^a$ with a radius $5^b$. Thus the longitudinal curve of the convex face 4 is sharper or more extreme than the curvature of the longitudinally concave face 5 and conforms to an arc of a different circle that is eccentrically related to the circle about which the concave face is formed.

As a result, in the case of a tooth that is symmetrically arranged on opposite sides of the center line of the gear face, as shown in Figs. 1 to 3, each tooth is widest at its central portion and tapers toward each end while each space between adjacent teeth is narrowest at its central portion and diverges somewhat toward the ends. This is illustrated in Fig. 4 which shows the contacting teeth in close engagement at the center and for a distance on opposite sides of the center while at the ends the adjacent tooth surfaces are slightly spaced and out of engagement. The difference between the circular arcs and radii is exaggerated in the drawings to illustrate the invention clearly, and it is to be understood that the degree of separation between the tooth faces at the ends of the teeth and the length of the area of close bearing or intimate contact between the tooth faces at the center depends on the difference in length between the radii of the circular arcs to which the two faces of each tooth conform, or to the difference between the sharpness of the curvature of the two faces of each tooth, and this can be varied to obtain a longer or shorter bearing or contact at the center of the gear face or any degree of separation at the ends as desired.

By cutting the convex and concave faces of the teeth on arcs which differ but slightly in their radial length, close bearing or contact can be had throughout nearly the entire length of the teeth and by cutting the concave and convex faces of each tooth on arcs of materially different radial lengths, a small area of close bearing at the center can be had with wider divergence between the engaging tooth faces at the ends, but with any differing relationship between the curvature of the convex and concave faces conforming to different eccentrically related circles, the closest bearing occurs at approximately the center of the tooth.

With a gear pair constructed in this fashion, the teeth of both members of the pair are similarly formed, that is to say, the longitudinally convex tooth faces on both members of the pair are cut on the same arc or with the same radius of circular cut and the concave tooth faces on both members of the pair are also cut on the same arc or with the same radius of circular cut but with a longer radius or flatter curve than the convex tooth faces and eccentrically related thereto. Consequently the convex tooth faces on one member of a pair contact the concave tooth faces on the other member of the pair and the relationship between the contacting faces is always as described above, with maximum bearing at the centers of the teeth or at points determined by the widest portions of the teeth which normally engage the widest portions of adjacent teeth.

Two such gears are produced by employing two rotary face mill cutters such as commonly used in the art in the production of curved tooth gears. The two cutters are rotated about two different centers with their tools located at different distances from the center, to cut the convex and concave faces as already described. It will be understood that the convex faces are cut at one time with their cutter and the concave faces at a different time with their cutter, one face at a time. Involute teeth are formed by imparting a relative generating movement to the tools and blank during cutting, as usual in the art of generated gears.

A gear formed in accordance with the structure illustrated in Figs. 1 to 4 will engage properly with a similarly constructed gear or pinion, and either spur or bevel gears can be constructed in the manner described. It is also possible to produce spiral spur or bevel gears as illustrated in Fig. 5, in which the cutter is so positioned with relation to a gear face as to form a tooth that has one end offset with relation to the other across the gear face. In the case of the spiral bevel gear diagrammatically illustrated, the convex tooth face 6 is formed by tools moving in an arc about a center $6^a$ with a radius $6^b$ and the concave tooth face 7 is formed by tools moving about a center $7^a$ with the radius $7^b$, and the mating pinion is similarly cut with two cutters rotating about similarly located centers.

While the invention has been described with reference to a particular construction, it is not confined to the exact details or arrangement shown, and this application is intended to cover such modifications, changes or other adaptations as may come within the purpose of the improvements or the scope of the following claims.

I claim:

1. The method of cutting a pair of longitudinally curved tooth gears which consists in moving tools in the same circular path to cut the convex faces of the teeth on both members of the pair and separately moving tools in the same circular path to cut the concave faces of the teeth on both members of the pair, the last mentioned circular path being eccentrically related to the circular path on which the convex faces are cut and having a radius substantially longer than the radius of the convex faces.

2. The method of cutting a pair of longitudinally curved tooth gears which consists in moving tools in the same curved path to cut the convex faces of the teeth of both members of the pair and separately moving tools in the same path to cut the concave faces of the teeth of both members of the pair, the last mentioned curved path being substantially less sharply curved than the first mentioned curved path and having a radius of greater length than the radius of the convex faces.

3. The method of cutting a pair of longitudinally curved tooth gears which consists in rotating a face mill to move tools in a circular path to cut the longitudinally convex faces of the teeth of both members of the pair about one radius and separately rotating a face mill having a substantially longer radius about a different center to move tools in a circular path of a longer radius eccentrically related to the first mentioned path to cut the longitudinally concave faces of the teeth.

HAROLD E. STONEBRAKER.

REFERENCES CITED

The following references are of record in the file of this patent:

UNITED STATES PATENTS

| Number | Name | Date |
| --- | --- | --- |
| 1,679,636 | Stonebraker | Aug. 7, 1928 |
| 1,788,639 | Stonebraker | Jan. 13, 1931 |
| 2,248,158 | Boor | July 8, 1941 |